United States Patent [19]
Bodin et al.

[11] Patent Number: 5,528,003
[45] Date of Patent: Jun. 18, 1996

[54] DATA COMPRESSION FOR PEN STROKE INPUT

[75] Inventors: William K. Bodin, Boca Raton; Ted Mueller, Boynton Beach, both of Fla.

[73] Assignee: International Business Machines Corporation, Armonk, N.Y.

[21] Appl. No.: 355,613

[22] Filed: Dec. 14, 1994

[51] Int. Cl.$^6$ ............................................... G08L 21/00
[52] U.S. Cl. .............................. 178/18; 382/202; 345/173
[58] Field of Search ...................................... 382/232, 239, 382/312, 313, 315; 178/18–20, 87; 345/156, 163, 189, 180, 181; 341/5; 395/147, 149, 155, 148, 146

[56] References Cited

U.S. PATENT DOCUMENTS

| | | | |
|---|---|---|---|
| 4,857,898 | 8/1989 | Smith . | |
| 5,073,966 | 12/1991 | Sato | 382/232 |
| 5,184,124 | 2/1993 | Molpus et al. . | |
| 5,220,649 | 6/1993 | Forcier | 395/148 |
| 5,247,138 | 9/1993 | Landmeier | 178/19 |
| 5,287,420 | 2/1994 | Barrett . | |
| 5,294,792 | 3/1994 | Lewis et al. | 345/180 X |
| 5,297,216 | 3/1994 | Sklarew | 382/232 |

OTHER PUBLICATIONS

Japan JP 62–84327 (ABSTRACT)—Method of Compressing Coordinate Data.
SLATE CORP., et al., "Rationale for the Ink Specification" (1993).

*Primary Examiner*—Stephen Chin
*Assistant Examiner*—Paul Loomis
*Attorney, Agent, or Firm*—Paul T. Kashimba; George E. Grosser; David L. McCombs

[57] ABSTRACT

A system for compressing pen stroke sequences according to a technique which first outputs an encoding flag indicating a pen touchdown or skipped coordinates, then the absolute values of the first pair of a sequence of horizontal and vertical coordinate pairs, followed by a sequence of nybbles each comprising two bits representing the difference between current and previous horizontal coordinates and two bits representing the difference between current and previous vertical coordinates, an encoding flag being used to terminate each such sequence when either a pen lift off occurs or a delta value exceeds a magnitude of one, the entire sequence being terminated by a further encoding flag. The system allows a high degree of compression to be obtained by storing each difference pair in a single nybble of data, as compared with storing the sequence of absolute coordinates or with known methods storing each difference pair in a single byte, thereby occupying much less memory without losing the ability to reconstruct the original coordinate pair sequence inclusive of any skipped coordinates.

21 Claims, 4 Drawing Sheets

DATA EXAMPLE - FIG. 2 DATA 8-BIT UNCOMPRESSED

| 00011001 C | 00000010 X | 00001001 Y |
| 00000001 X | 00001001 Y | 00000001 X |
| 00001000 Y | 00000001 X | 00000111 Y |
| 00000010 X | 00000111 Y | 00000010 X |
| 00000110 Y | 00000010 X | 00000101 Y |
| 00000011 X | 00000101 Y | 00000011 X |
| 00000100 Y | 00000100 X | 00000100 Y |
| 00000100 X | 00000111 Y | 00000101 X |
| 00000111 Y | 00000101 X | 00000010 Y |
| 00000110 X | 00000010 Y | 00000111 X |
| 00000001 Y | 00001000 X | 00000001 Y |

...

DATA EXAMPLE - FIG. 2 DATA AS COMPRESSED

| 000000 01 EF | 00000010 XL | 00001001 YL |
| 00000000 XYH | 1000 00010 D | 0010 0100 D |
| 0010 0010 D | 0100 0010 D | 0100 0010 D |
| 0100 0010 D | 0100 0110 D | 0100 0100 D |
| 0001 00001 D | 00001 10000 D | 00001 1000 D |
| 1000 1000 D | 111 EF 0000 01 EF | 00001001 XL |
| 00001001 YL | 00000000 XYH | 0100 0010 D |
| 0100 0100 D | 0010 0100 D | 0010 0010 D |
| 1000 00001 D | 1000 10000 D | 00001 00001 D |
| 00001 0100 D | 0100 0100 D | 0100 0010 D |
| 0100 0110 D | 0100 0010 D | 0100 0001 D |
| 0001 00001 D | 1000 01110 D | 0110 0110 D |
| 0100 0100 D | 0101 00001 D | 0001 111 EF 11 EC |

DATA COMPRESSION FOR PEN STROKE INPUT

TECHNICAL FIELD

This invention relates to a software compression algorithm for pen-based stroke data input and storage within a personal computer system.

BACKGROUND OF THE INVENTION

Pen-based computer systems accept input data in the form of pen strokes made by the operator on a tablet or digitizer pad responsive to pressure, proximity or contact of a stylus or pen thereon. The digitizer produces digital output signals corresponding to the horizontal (x) and vertical (y) coordinates of the location of the stylus on the digitizer pad, which coordinates are stored in time sequence in the computer memory. These pen strokes are then analyzed to determine what input they represent; commands, text, drawings, or the like. Since the input data rate may be quite high, some form of data compression is generally desirable, to reduce the amount of memory required to store any sequence of pen stroke data.

One technique for data compression is described in the so-called "JOT" specification, more formally identified as "A Specification for an Ink Storage and Interchange Format" copyrighted by Slate Corporation, and jointly developed with Lotus Development Corporation, GO, Microsoft, Apple, General Magic, and other pen-based computer software developers. The JOT specification addresses the technique of data compression by the storage of deltas, or differences between consecutive coordinates, rather than storage of absolute coordinates. In the JOT specification, optionally ink color and pen size, among other characteristics, may be stored along with the compressed data, but the compression scheme does not require this extraneous data to be stored. Deltas may be stored in 16-bit, 8-bit or 4-bit formats per point. However, a disadvantage of the JOT formats is that they are not capable of achieving desired levels of compression when pen-stroke data is received at a very high rate.

Another compression technique of interest is described in Japan Patent No. JP 62-84327, "Method of Compressing Coordinate Data," issued Apr. 17, 1987, assigned to Seiko Epson Corporation. This technique describes the elimination of noise and redundant information by assuming and applying a simple frame for data compression for a large quantity of coordinate data sampled in time series at the time of data input. While this method is intended for use with pen stroke data, it is not particularly efficient in the compression of data for such applications.

What is needed is an improved compression system for compressing coordinate pen-stroke data received at a high rate from a pen tablet or digitizer pad that significantly reduces the amount of memory required to store the data while retaining the ability to reproduce the original sequence of pen coordinates sampled at the time of data input.

SUMMARY OF THE INVENTION

The foregoing problems are solved and a technical advance is achieved by the compression system of the present invention which distinguishes between differences (or deltas) of various sizes in the storage of differences between successive pairs of pen-stroke data coordinates. For example, if the x and y differences are of maximum magnitude 1, both the x and y deltas are stored in a single nybble of data. The system accepts a high data rate thereby expecting most differences between successive coordinates to be zero or one in magnitude wherein a high degree of compression is obtained. Storing each difference pair in a single nybble of data is more efficient than prior techniques of storing the sequence of absolute coordinates or storing each difference pair in a single byte, the present technique thereby occupying much less memory without losing the ability to reconstruct the original coordinate pair sequence inclusive of any skipped coordinates.

In a preferred embodiment, a system is provided for compressing pen stroke sequences according to an algorithm which first outputs an encoding flag indicating a pen touchdown or skipped coordinates, then the absolute values of the first pair of a sequence of horizontal and vertical coordinate pairs, followed by a sequence of nybbles each comprising two bits representing the difference between current and previous horizontal coordinates and two bits representing the difference between current and previous vertical coordinates, an encoding flag being used to terminate each such sequence when either a pen lift off occurs or a delta value exceeds a magnitude of one, the entire sequence being terminated by a further encoding flag.

More specifically, the system of the present invention encodes the successive coordinates transmitted to it from a digitizer tablet into a number of compressed stroke sequences each encoded according to a special encoding format. The encoding format comprises an initial flag indicating whether the following data is a sequence following a pen touchdown or a skip sequence following a pen coordinate increment of greater than 1; the initial horizontal and vertical coordinate pair of the sequence, occupying as many bits or bytes as needed for their full representation; a number of delta pairs each consisting of two bits for the difference between the current and previous horizontal coordinates and two bits for the difference between the current and previous vertical coordinates; and a terminating flag; the last compressed stroke sequence being followed by a further terminating flag indicating the end of transmitted data.

In further explanation of the present invention, a pen-based computer digitizer tablet or pad contemplated for use with the invention may operate in the analog domain, producing analog signals corresponding to the stylus position, which are then converted to digital form by an analog to digital (A/D) converter. This will necessarily quantize the spatial coordinates into an image equivalent to a certain number of rows and columns of individual elements passed over by the stylus in succession. Alternatively, the digitizer may employ spatial quantization directly, converting the numerical coordinate values into binary coded form. However generated, these digital coordinate pairs are presented to the receiving apparatus in rapid succession. In addition to the coordinate data, various tablets may provide either pen proximity or pen contact information, which may be used to determine whether the pen is making a stroke or is moving to the starting point of a new stroke while off the pad.

A display may resolve, for example, 100 rows each comprising 240 elements, each element being a single pixel (pel) of the image traced out by the stylus. Thus the memory required to store each pair of (x,y) coordinates in this case will be at least 15 bits, and more probably two bytes. In memory, each coordinate may ordinarily be stored as an integer, taking four bytes to store each coordinate pair.

Data from the digitizer may be generated at high rates such as greater than 100 coordinate pairs per second. In order to store such data efficiently, some form of data compression is desirable. Without compression, in the above example, storage of data accumulated in ten seconds at 100 points per second could require 4,000 bytes. The data may be acquired in real time by sampling the analog signals or their digital equivalents at a specific sampling rate, or by storing each new digitized value only when it occurs. The latter method may be approximated in the former case by only storing the data when a change has occurred and eliminating successive coordinate pairs having duplicate values.

Instead of the old method of storing each coordinate pair generated in time sequence, an alternative known method (see the JOT specification) stores the differences (or deltas) between successive pairs of coordinates, rather than the absolute values of the coordinate pairs. Since these deltas are usually much smaller than the absolute coordinates, significantly less data is required to be stored.

One major contribution to the degree of compression of the coordinate data is a reduction of the size of the variable which stores each delta. Assuming that the maximum size of delta is not more than 15 pixels, each delta could occupy a nybble (4 bits) allowing for both delta x and delta y to be saved in a single byte of memory, instead of occupying two or more bytes. The minimum size limit for delta storage is determined by how large the maximum delta value can become. The data storage required in the previous example could be reduced to 1000 bytes.

In accordance with the present invention, a substantial reduction of data storage is achieved by distinguishing between deltas of various sizes. If the x and y deltas are of maximum magnitude 1, both x and y deltas may be stored in a single nybble of data. A rapid sequence of such deltas may be expected when the pen is moving. In some cases, a delta greater than 1 may be observed, even though the pen remains on the tablet, and the new coordinates may be recorded as the starting point of a new sequence of deltas as a skip from the previous sequence's terminating values. An application may fill in the skipped points by means of a curve-fitting algorithm. However, the higher the sampling rate, the lower the incidence of deltas greater than 1 in magnitude.

If a "pen up" condition is observed, i.e. the pen is not touching the tablet, a new sequence will be started when the pen again touches down. A pen up condition may be defined as zero force, or when contact no longer exists with the tablet.

The data is stored by first recording the initial (x,y) coordinate values; recording whether the coordinates resulted from a pen touchdown or a skip; then recording the continuing sequence of pen movements of one pixel or less in each direction. Consecutive duplicate values are not stored. The end of a sequence of deltas is indicated by a 2-bit flag sequence, which must be followed by a new set of data.

A technical advantage achieved with the compression technique of the invention is that it capitalizes on expecting a high data rate and therefore is able to store delta data in only two bits per coordinate, for long sequences of coordinates. Thus a high compression ratio is achieved, but without compromising the ability to store deltas greater than 1 due to skipped values.

Another technical advantage achieved is a significant reduction in the amount of memory required to store pen-stroke data while retaining the ability to reproduce the original sequence of pen coordinates sampled at the time of data input.

DESCRIPTION OF THE ILLUSTRATIVE EMBODIMENTS

Figure 1:
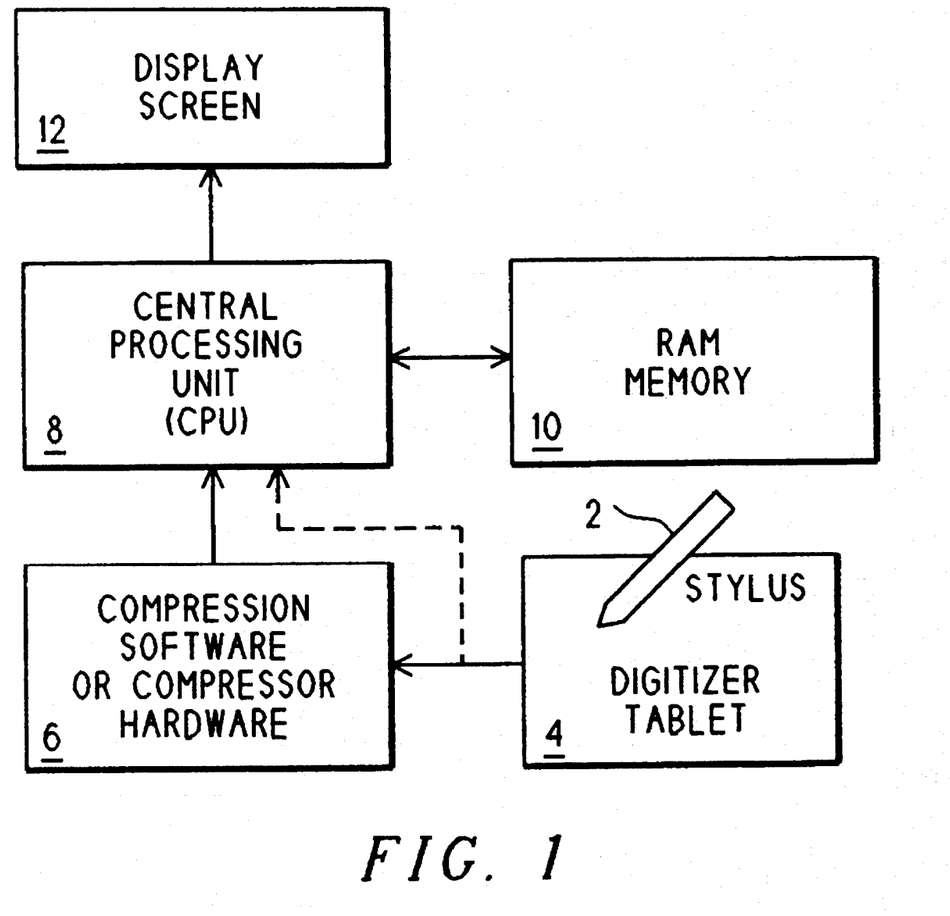
FIG. 1 is a representation of a computer system incorporating a pen input digitizer tablet and data compression according to the invention.

In FIG. 1 the reference numeral 1 refers generally to a personal computer system incorporating features of the present invention. The system 1 includes a pen or stylus 2 and digitizer tablet 4 for pen-based input, a compression software or compressor hardware system 6 for compressing the pen stroke data according to the unique arrangement of the invention (discussed in detail below), a central processing unit (CPU) 8 for processing the information input via the digitizer tablet 4, a random access memory (RAM) 10 for storing the processed pen stroke information, and a display 12 for displaying the results of processing the pen-based input.

It should be noted that the display 12 is not a required component and is not a part of the means for collecting and processing the pen stroke data. Rather, it is an optional output device for displaying the results of CPU operations.

Typically, the digitizer tablet 2 may have a very high resolution resolution, e.g. 500 points per inch, while the display 12 may have a lower resolution than this. The CPU 8 may have only a limited amount of memory 10 associated with it, and conservation of memory is an important requirement.

In application, the user writes on the digitizing tablet 4 with the pen or stylus 2, and typically this input may be reproduced on the screen 12 in some way. The location of the point of contact of the stylus 2 on the digitizer tablet 4 may be sampled frequently by the data compressor 6, e.g. at a rate of 100 times per second.

When the pen 2 touches down on the tablet 4, the compression algorithm is started by outputting a two bit encoding flag followed by the initial x and y values, using an appropriate number of bytes for each value. In the present example, using a 240×100 display, only two bytes would be needed, since both dimensions are less than 256. However, for more generality, two bytes may be used to encode each of the x and y coordinates if desired, or one byte may be used to encode the high order nybble of a 12-bit representation of both x and y coordinates. After the first data points come a succession of data nybbles each comprising an x delta and a y delta. The sequence is terminated by a two-bit code. Additional sequences in the same format follow, as the pen either skips through a larger delta or is lifted off and a new stroke occurs to a different location. These data sequences can be stored in memory 10 by the CPU 8 and/or displayed on the screen 12 by decompressing them.

In addition to the above functions of storing and displaying the pen strokes, the CPU 8 may also be capable of executing a software program 6 to compress the incoming pen stroke data, or of receiving compressed pen stroke data from a hardware device 6 which executes the compression algorithm described. Also, the CPU 8 may run software programs which, for instance, convert pen stroke data into ASCII text or drawings, displaying the results on the screen 12. If compression is being achieved by a software program 6, the digitizer tablet 4 may be connected directly to an input port of the CPU 8 instead of to the compressor 6, as indicated by the broken line.

Figure 2:
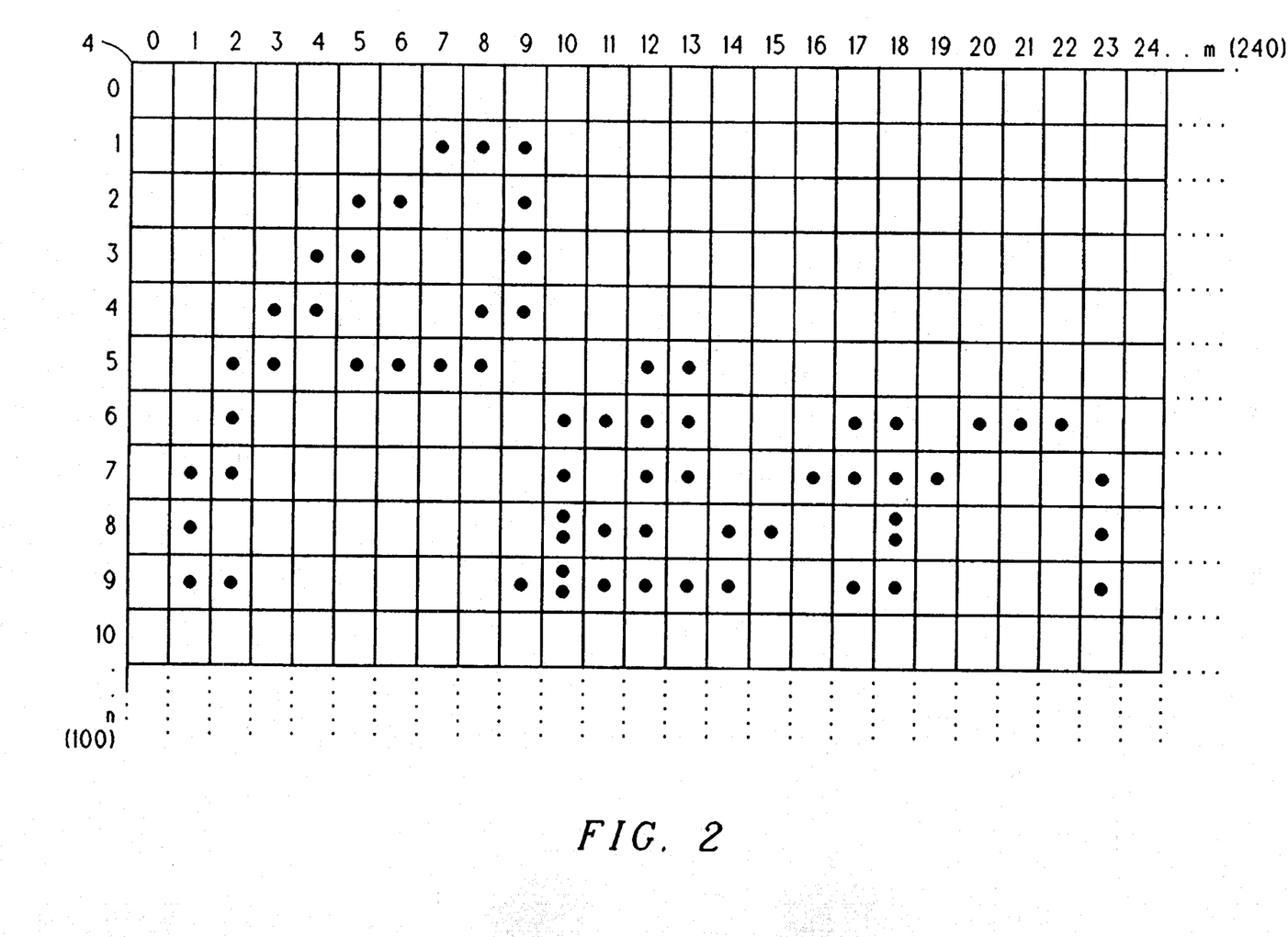
FIG. 2 is a representation of a portion of a digitizer tablet whereon some pixels have been passed over and turned on in time sequence by a pen stroke.

Referring to FIG. 2, an example of a sequence of pen strokes, or ink bundle, is shown. The area shown is a portion of a larger display 12 of size 240 columns×100 rows, the portion shown having 25 columns and 11 rows. The pen (not shown), starting at the bottom of the "P" of the word "Pen", has traversed the letter "P" successively passing over those pixel elements shown with dots. In a second pen stroke, the letters "en" were traversed.

Thus the sequence of coordinate values transmitted in the first pen stroke may have been, in this example: (2,9) (pen down), (1,9), (1,8), (1,7), (2,7), (2,6), (2,5), (3,5), (3,4), (4,4), (4,3), (5,3), (5,2), (6,2), (7,1), (8,1), (9,1), (9,2), (9,3), (9,4), (8,4), (8,5), (7,5), (6,5), (5,5), (pen up), a sequence of 25 points. Other sequences could also generate this pattern of pixels. These coordinates may have been encoded in a variety of ways, including those to be described with reference to FIG. 3.

The origin in this case is at the top left of the digitizer, and y coordinates therefore increase downwards, but alternative coordinate schemes can be used without affecting the compression principles to be described below.

The second sequence describing the letters "en" would have commenced with a pen down at (9,9), continuing until the pen up occurs at (23,9). This second sequence must comprise at least 35 points, but three points have been passed over twice, because, in cursive writing, the pen often crosses a line previously written. These points are shown with two dots, rather than one, in the pixel area. In reality, the screen image would show one pixel as being on, no matter how many times it had been traversed by the pen.

Clearly, the 63 points passed over could be stored as a sequence of 126 byte values totaling 1008 bits, or as 63 15-bit values, which would total 945 bits, if the sequence is allowed to ignore byte boundaries. Some overhead is necessary to define the start and end of the sequences. An inefficient but common method of storage would employ an integer variable per coordinate, for a total of 126 integer values totaling 2016 bits.

Using a method in which the 24 succeeding points after the first are stored using a nybble for each delta (i.e. one byte per point), the first sequence would occupy 26 bytes plus a terminating byte, and the second would occupy 36 bytes plus a terminating byte. This would result in a total of 64 bytes, or 512 bits, for the entire sequence, yielding a compression ratio of less than 2:1. Slightly better results may be obtained if byte boundaries are ignored.

On the other hand, with the invention to be described, the first sequence of 25 points could be stored with a header of 2 bits, initial coordinates of 12 bits, encode data of 96 bits, and end of stroke code at 2-bits, for a total of 124 bits. The second sequence would be 52 bits longer, for a total of 176 bits. A two-bit sequence indicates the end of the compressed data. Thus the entire sequence would be transmitted and stored in a total of 302 bits, yielding a compression of better than 3:1 relative to the byte per coordinate scheme.

TABLE I

COMPRESSED STROKE STRUCTURE VARIABLES AND BIT DEFINITIONS

| VARIABLE NAME | SIZE | COMMENTS |
|---|---|---|
| EncodeFlags | 2 bits | Touchdown, Skip, or End of Data |
| IniXYLow | 16 bits | Initial x, y coordinates, low byte |
| IniXYHigh | 8 bits | Initial x, y coords., high nybble |
| EncodeData | 2 bits | Contains single encoded x delta |
| EncodeData | 2 bits | Contains single encoded y delta |
| EncodeData | 2 bits | Contains single encoded x delta |
| EncodeData | 2 bits | Contains single encoded y delta |
| " | " | " |
| EncodeFlags | 2 bits | End compressed stroke sequence |

| VARIABLE | CODE | DEFINITION |
|---|---|---|
| EncodeFlags | 00 | Not used |
|  | 01 | Pen touchdown |
|  | 10 | Skip (delta x or delta y > 1) |
|  | 11 | End of Compressed Stroke Structure |
| EncodeData | 00 | No change this axis (x or y) |
|  | 01 | Increase by 1 this axis |
|  | 10 | Decrease by 1 this axis |
|  | 11 | Not used |
| IniXYLow |  | Initial x, low byte, initial y, low byte |
| IniXYHigh |  | Initial x, hi nybble, initial y, hi nybble |

Referring to Table I, there is described a data sequence format called a compressed stroke structure (CSS). This sequence comprises a 2-bit initial variable EncodeFlags, a 16-bit variable IniXYLow, an 8-bit variable IniXYHigh, and a sequence of EncodeData nybbles each comprising two bits for delta x and two bits for delta y. The structure terminates with an EncodeFlags which takes an end of sequence value.

The variable bit values are as follows: for EncodeFlags, a value of 01 indicates a pen touchdown "xyStart", 10 indicates a skipped point "xySkip", and a value of 11 indicates end of the complete compressed sequence "compEnd".

IniXYLow contains the low order byte of the x coordinate followed by the low order byte of the y coordinate of the starting point of the sequence. IniXYHigh contains the upper nybble of the x and y coordinates, allowing for a 12-bit representation of both x and y coordinates. This allows a typical 12-bit A/D converter to be used, with a maximum of 4096 pixels in each dimension of the digitizer pad.

The EncodeData nybble structure comprises two bits for each axis, x first, with the value 00 indicating no change, 01 representing an increase by 1, and 10 representing a decrease of 1. The sequence is terminated by an EncodeFlags value 11.

Thus, in the specific example of FIG. 2, the total number of bits required to store the sequences corresponding to the pen strokes producing this image is 302 bits.

It should be noted that the EncodeData values can only be 00, 01, or 10. An encode flag value of 11 therefore terminates a CSS unambiguously. Since the EncodeFlags for the start of the next sequence can take values of 01, 10 or 11, there must be a sequence end code (11) before the next sequence start code occurs, or it would be confused with data. A start code of 11 indicates the end of all the data stored, i.e. the end of the ink bundle, and is therefore not followed by additional bits of data. After an EncodeFlags value of 11, the next non-zero value will be regarded as an EncodeFlags value, and zero values (00) are ignored.

Figure 3:
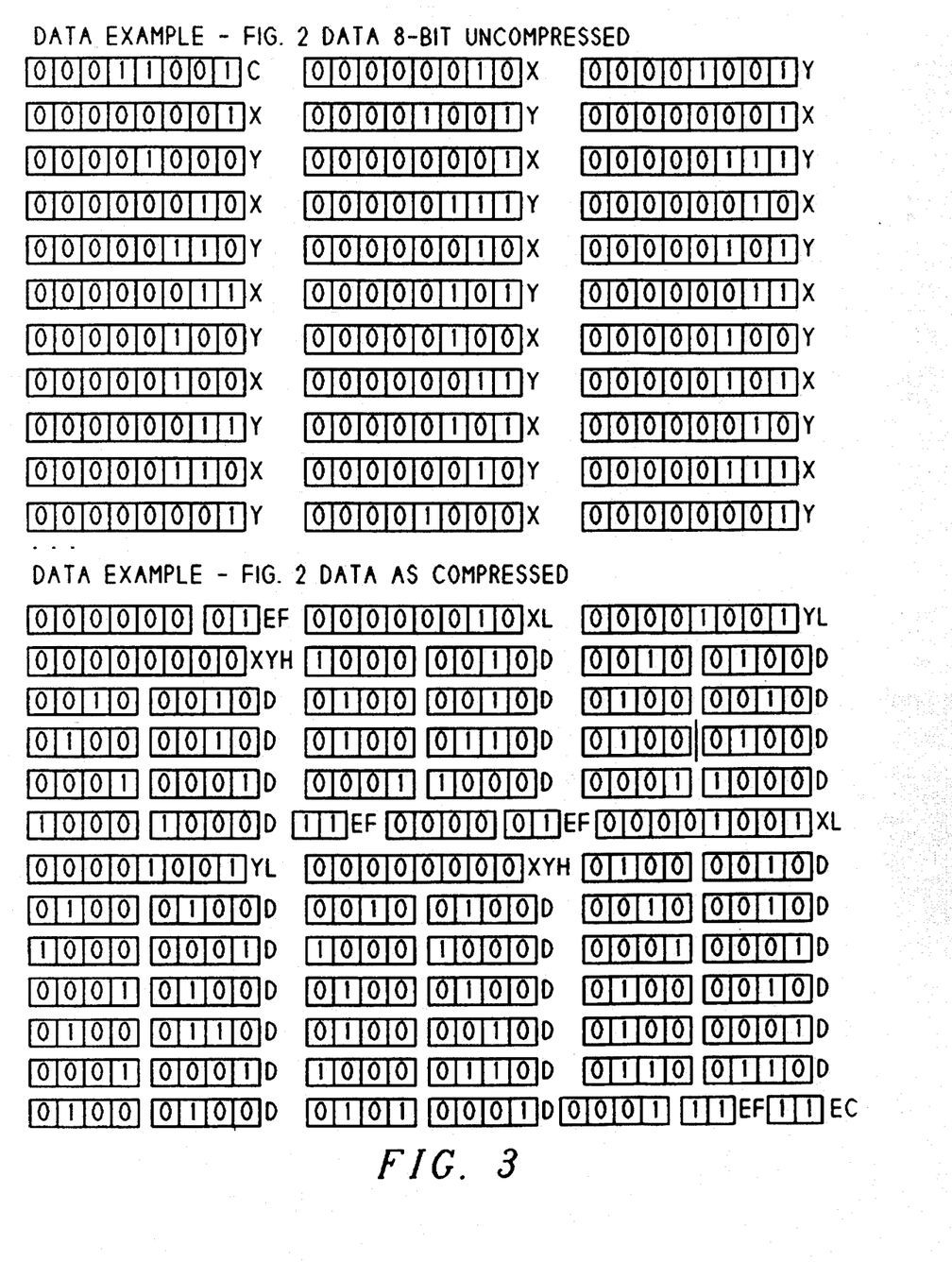
FIG. 3 is a representation of a portion of the uncompressed sequence of pen coordinates shown in FIG. 2, together with a representation of the same sequence using the compressed stroke structure of Table I.

Referring to FIG. 3, there is shown an example of an uncompressed 8-bit representation of some of the pen stroke data in FIG. 2, together with an encoded compressed stroke structure corresponding to the pen strokes of FIG. 2, using the bit definitions of Table 1 above.

The two sequences of FIG. 2 comprise 25 and 38 points. Assuming 12-bit resolution, each (x, y) coordinate pair would occupy 3 bytes, so the first sequence takes 75 bytes and the second takes 114 bytes to store in uncompressed form. Added to these there must be an initial count of (x, y) pairs, which may be assumed to occupy one byte each. This yields a total of 191 bytes to store the entire sequence uncompressed. If the individual points are stored only at 8-bit resolution, as shown, the two sequences total 128 bytes.

In the upper part of FIG. 3, the first part of the "P" sequence is stored as follows. The first byte, labeled C, represents a count of the following byte pairs, each of which represents one coordinate pair at eight bit resolution. The following sequence of x and y values are just the coordinates as listed in the description above with reference to FIG. 2. Elision dots at the end of this sequence indicate that the sequence actually continues beyond this point.

The lower portion of FIG. 3 represents the entire ink bundle shown in FIG. 2, using the compression method of the present invention. Variable names have been compacted in the figure for clarity. EncodeFlags is represented by EF, and IniXYHigh is represented by XYH, for example.

Using the method of the invention, the first CSS sequence comprises a 2-bit flag (EF), 3 bytes for initial (x, y) coordinates (XL, YL, XYH), and 12 bytes to store the next 24 coordinate deltas (D), followed by a 2-bit end of data code (EF). This totals 124 bits. The end of the data shown in the upper part of FIG. 3 is represented by a vertical line in the fourth row of the lower part of FIG. 3, to show how much compression results from this scheme.

The second CSS sequence comprises a 2-bit flag (EF), 3 bytes for the initial (x, y) coordinates (XL, YL, XYH), and 37 pairs of 2-bit deltas (D), plus a 2-bit end of sequence flag (EF), and it is followed by a 2-bit end of compression flag (EC). The terminating 2-bit EF of the first sequence and the initial 2-bit EF of the second sequence are stored in the same byte in this example, separated by "00" pairs, which are ignored in decompression since they have a null value as an EncodeFlags variable. The termination of the sequence is represented by the penultimate "11" EF variable and the end of the entire pen stroke data or ink bundle by the final "11" EF variable.

The total for this sequence is 178 bits. The grand total is thus 302 bits, or less than 38 bytes. Two additional bytes would be saved if the initial (x, y) coordinates were only stored to 8-bit resolution.

In practice, for reasons of convenience in defining variable boundaries, the first EncodeFlags (EF) may be expanded by leading zeros to occupy one byte as shown in FIG. 3, the intermediate EncodeFlags (EF) terminating the first sequence and starting the second may occupy one byte with zeros between the two flags, and the final 37 points plus the final EncodeFlags (EF) may occupy 18 bytes, so that all data begins and ends on byte boundaries. This expands the sequence to a total of 39 bytes, or 37 bytes for 8-bit representation.

Since the same sequence of values stored as 12-bit values in each of x and y coordinates would have occupied a grand total of 191 bytes, a compression ratio of 4.9:1 has been achieved in this example. For 8-bit values the compression ratio is 128:37 or about 3.46:1.

The storage requirements for the entire 240×100 array may also be computed as 240×100 pixels, at 8 pixels per byte, which turns out to be 3000 bytes. This would be the requirement for screen memory if the screen resolution is 240×100 pixels. A conventional compression scheme such as run-length or Lempel-Zev coding might be employed to store this data more efficiently.

However, storage of the array of pixels is not equivalent to storage of the pen strokes which produced the resultant display. Use of the pixel array would lose the actual time sequence of the data. Character recognition algorithms for pen-based computers may rely on the sequence in which various areas of the character cell are traced over time. In this case, it would be appropriate to store all samples including those where both deltas are zero, to obtain an absolute time sequence, even though this would occupy more memory.

It may easily be seen that if the resolution of the digitizer is much higher than that of the screen, and pixel data are not needed for high resolution reproduction (e.g. for a signature to be included as a graphic element in a letter, etc.), the sequences stored to represent the screen data may be much reduced even from the data that can be output by the digitizer. Even though the digitizer may be generating 12-bit (x, y) coordinates at a high resolution, it may be converted to much lower resolution by truncation to more appropriate word lengths suitable for the screen resolution.

For example, the lower four bits may be dropped, in which case the data reduces to 8-bit resolution or 256×256 display, and one more bit still may be removed from the y-axis to yield a 256×128 display space. Alternatively a division algorithm may be used to generate 100 discrete y values and 240 discrete x values from the 4096×4096 value input sequences. The output of this reduced resolution (x, y) pair sequence would usually only yield an output nybble of delta data when one or both coordinates changed at this lower resolution. Hence both the number of output bits and their bit rate would be greatly reduced.

Figure 4:
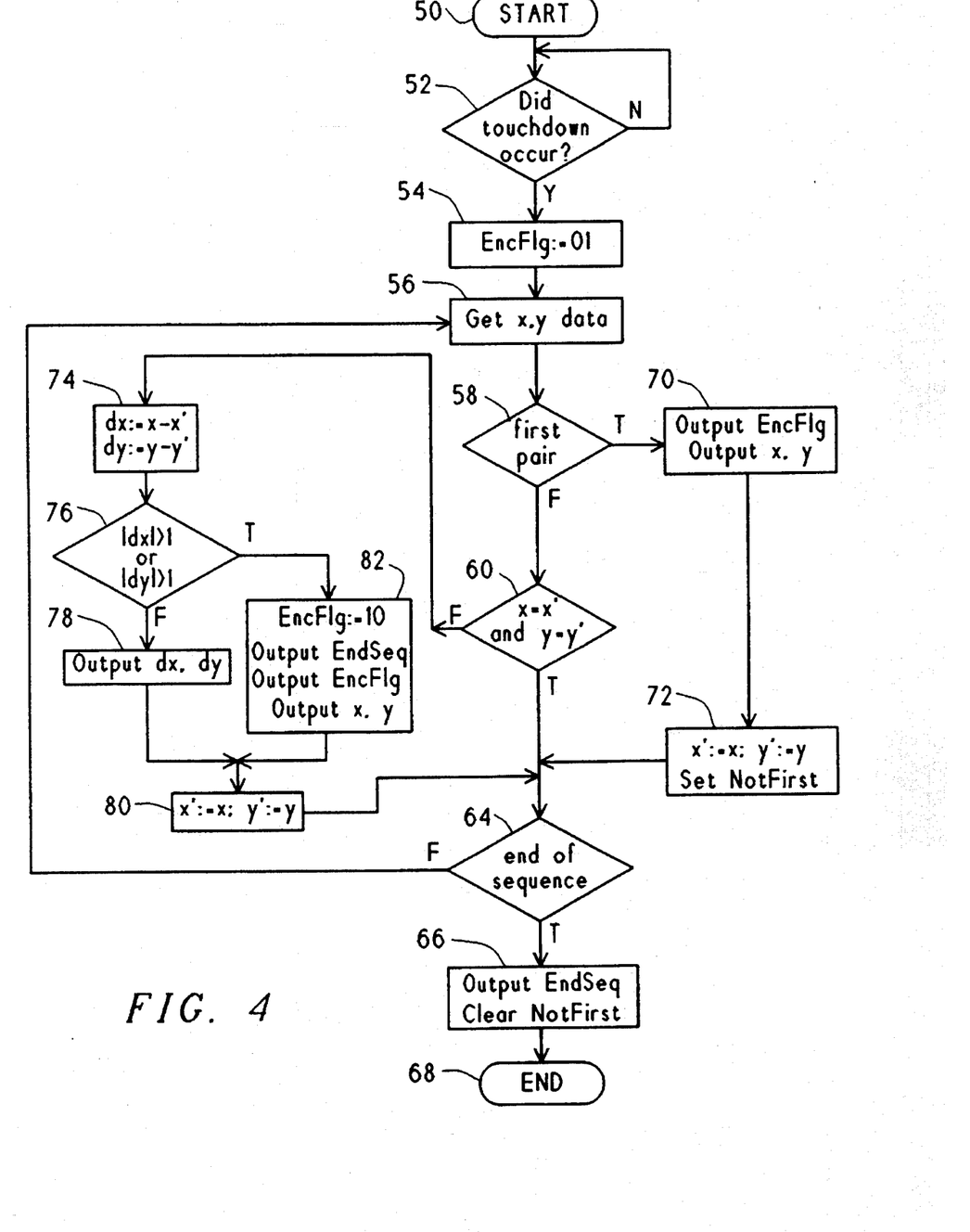
FIG. 4 is a flow chart describing a compression algorithm which generates the compressed stroke structure data format according to the invention.

Referring to FIG. 4, a flow chart of the new compression algorithm is presented. The algorithm is entered through the START box 50, and a test for touchdown in box 52 causes the program to loop until a touchdown occurs. Then, the Encode Flags variable (abbreviated here to EncFlg) is set to 01 in assignment box 54, using the assignment operator ":=".

The current x, y data values are retrieved from the digitizer (or from memory, if the data is buffered) in box 56. A test in box 58 determines whether this is the first pair of coordinates or not; this test will succeed the first time and thereafter will not. If it succeeds, the algorithm will output the EncFlg value, then the x and y values in the chosen format, as stated in box 70. In box 72 the present values of x and y will be saved in the variables x' and y' and a flag NotFirst is also set, allowing this flag to be tested in box 58.

If the test in box 58 fails, the data is next checked in test box 60 to see if the x and y values are both equal to the previous values x' and y'. If neither coordinate has changed, box 64 tests for the end of data in the sequence, and if not ended, the program loops back to box 56 to get more data. If either coordinate has changed, the delta x, dx is computed when box 74 is reached.

This method ensures that repeated coding of the same coordinates is ignored until the next coordinate change occurs. Without this, there could be considerable wasted memory storing deltas of zero in both x and y coordinates. However, when storage of zero deltas is desired so as to keep an absolute time reference for each point in the sequence, the test in box 60 may be omitted and execution may take the path through box 74 in all cases.

If test 60 fails, one or both of the deltas being non-zero, the delta values dx and dy are calculated in assignment box 74. They are then tested in box 76 and if neither is greater than 1 in magnitude, box 78 causes dx and dy to be output as a nybble of data, using the coding scheme stated above. Box 80 updates the values of x' and y' to the current x and y values. Execution then returns to the end of sequence test in box 64.

If the magnitude of dx or dy exceeds 1, box 82 will first set EncFlg to binary value 10 indicating a skip, then output a binary 11 code EndSeq to end the data sequence, followed by the 2-bit EncFlg value to start a new sequence, and the full x and y values. If byte boundaries are being observed, box 82 may encode the two flags so that the following values start and end on byte boundaries. Execution continues to box 80 and then to box 64 as described above.

If the sequence is ended, the test in box 64 succeeds and the EndSeq code is outputted in box 66, whereupon the flag NotFirst is cleared. At this point the flow reaches the END box 68. Other actions may then be taken, such as interpreting the pen stroke data, or returning to the encoding algorithm to encode the next pen stroke in the same way. If a timeout occurs before another pen stroke, the compression algorithm may determine that no more pen strokes are required in the ink bundle being encoded, and may output a final binary 11 EndComp flag (not shown.)

The sequence of (x, y) coordinate pairs may alternatively first be stored in a buffer (at full resolution), until a pen liftoff occurs, after which the data points just obtained are converted as in FIG. 4.

The algorithm may be expanded to record the delta time from the start of the pen stroke, if required, and to insert a header carrying information about the type and color of "ink" represented by the pen stroke data.

These and many other variations may be made by those skilled in the art without departing from the spirit of the invention as outlined in the specification and the attached claims.

What is claimed is:

1. A pen-based computer system comprising:

a central processing unit (CPU) means having at least one input port, and a system bus;

random-access memory (RAM) accessible to said CPU means through said system bus;

an encoding means having an input port and an output port, said output port being connected to an input port of said CPU for transmission thereto of encoded pen stroke data, said encoded pen stroke data being stored in said RAM;

a digitizer tablet means connected to the input port of said encoding means for transmission thereto of unencoded pen stroke data; and a stylus or pen for use with said digitizer tablet means, said digitizer tablet means being operative to transmit to said encoding means the successive coordinates of the point of contact of said stylus or pen with said digitizer tablet means;

said encoding means being operative to encode the successive coordinates transmitted to it from said digitizer tablet means into a number of compressed stroke sequences each encoded according to the encoding format comprising:

an initial flag indicating whether the following data is a sequence following a pen touchdown or a skip sequence following a pen coordinate increment of greater than 1;

the initial horizontal and vertical coordinate pair of the sequence, occupying as many bits or bytes as needed for their full representation;

a number of delta pairs each consisting of two bits for the difference between the current and previous horizontal coordinates and two bits for the difference between the current and previous vertical coordinates; and a terminating flag;

the last said compressed stroke sequence being followed by a further terminating flag indicating the end of transmitted data.

2. The apparatus of claim 1 wherein said pen-based computer system further comprises a display means for displaying the results of operations taking place in said CPU means.

3. The apparatus of claim 1 wherein said initial flag of said encoding format comprises two bits and encodes a pen touchdown as the binary value 01 and a skip sequence as the binary value 10.

4. The apparatus of claim 1 wherein said initial horizontal and vertical coordinate pair of said encoding format comprises eight bits representing the initial horizontal coordinate and eight bits representing the initial vertical coordinate.

5. The apparatus of claim 1 wherein said initial horizontal and vertical coordinate pair of said encoding format comprises eight bits representing the low byte value of the initial horizontal coordinate, eight bits representing the low byte value of the initial vertical coordinate, and eight bits representing the high nybble value of the initial horizontal coordinate concatenated with the high nybble value of the initial vertical coordinate.

6. The apparatus of claim 1 wherein said delta pairs of said encoding format are encoded with the binary value 00 representing no change in the coordinate, the binary value 01 representing an increase of 1 in the coordinate, and the binary value 10 representing a decrease of 1 in the coordinate, all relative to the previous coordinate pair values.

7. The apparatus of claim 1 wherein each said terminating flag of said encoding format occupies two bits and comprises the binary value 11.

8. The apparatus of claim 1 wherein any of said initial or terminating flags of said encoding format may be expanded to a full byte so that different elements of said encoding format all fall within byte boundaries.

9. A pen-based computer system comprising:

a central processing unit (CPU) means having at least one input port, and a system bus;

random-access memory (RAM) accessible to said CPU through said system bus;

an encoding program operating in said CPU;

a digitizer tablet means connected to an input port of said CPU;

a stylus or pen for use with said digitizer pad, which is operative to transmit to said encoding means the successive coordinates of the point of contact of said stylus or pen with said digitizer pad; and a display means for displaying the results of operations taking place in said CPU;

said encoding program being operative to encode the successive coordinates transmitted to it from said digitizer tablet means into a number of compressed stroke sequences each according to the format comprising:

an initial flag indicating whether the following data is a sequence following a pen touchdown or a skip sequence following a pen coordinate increment of greater than 1;

the initial horizontal and vertical coordinate pair of the sequence, occupying as many bits or bytes as needed for their full representation;

a number of delta pairs each consisting of two bits for the difference between the current and previous horizontal coordinates and two bits for the difference between the current and previous vertical coordinates; and a terminating flag;

the last said compressed stroke sequence being followed by a further terminating flag indicating the end of transmitted data.

10. The apparatus of claim 9 wherein said pen-based computer system further comprises a display means for displaying the results of operations taking place in said CPU means.

11. The apparatus of claim 9 wherein said initial flag of said encoding format comprises two bits and encodes a pen touchdown as the binary sequence 01 and a skip sequence as the binary sequence 10.

12. The apparatus of claim 9 wherein said initial horizontal and vertical coordinate pair of said encoding format comprises eight bits representing the initial horizontal coordinate and eight bits representing the initial vertical coordinate.

13. The apparatus of claim 9 wherein said initial horizontal and vertical coordinate pair of said encoding format comprises eight bits representing the low byte value of the initial horizontal coordinate, eight bits representing the low byte value of the initial vertical coordinate, and eight bits representing the high nybble value of the initial horizontal coordinate concatenated with the high nybble value of the initial vertical coordinate.

14. The apparatus of claim 9 wherein said delta pairs of said encoding format are encoded with the binary value 00 representing no change in the coordinate, the binary value 01 representing an increase of 1 in the coordinate, and the binary value 10 representing a decrease of 1 in the coordinate, all relative to the previous coordinate pair values.

15. The apparatus of claim 9 wherein each said terminating flag of said encoding format occupies two bits and comprises the binary value 11.

16. A compression method for encoding pen stroke coordinate sequences comprising the steps of:

determining when a pen touchdown has occurred;

setting an encoding flag to a value indicative of a pen touchdown;

inputting a horizontal and vertical coordinate pair from a sequence of such pairs, each said sequence being terminated when a pen life-off occurs;

determining whether the said coordinate pair is the first of a said sequence of such pairs;

if so, then outputting said encoding flag value followed by the absolute horizontal and vertical coordinate pair values and saving these values for comparison; otherwise, comparing the current values of said coordinate pair with the saved values of the previous coordinate pair;

if one or both of the horizontal and vertical coordinates of the current pair has changed from the previous values, then computing the differences between the current and previous values;

if either of said differences exceeds 1, then setting an encoding flag to a value indicative of skipped points, outputting said encoding flag followed by the absolute horizontal and vertical coordinate pair values; otherwise, outputting said differences between said current and previous horizontal and vertical coordinates as a single nybble of data in an encoded form;

saving the current horizontal and vertical coordinates for comparison;

after completion of all the above operations and tests, determining whether there are additional points in the said sequence of such coordinate pairs;

if so, returning to the step previously stated of inputting the next said horizontal and vertical coordinate pair; otherwise, setting an encoding flag to a value indicative of the end of said sequence of coordinate pairs and outputting the said encoding flag; and repeating the above-stated sequence of steps until there are no more sequences of such coordinates to be compressed and outputting a final said encoding flag set to a value indicative of the end of all said sequences of such coordinates.

17. The method of claim 16 wherein the step of comparing the current and previous coordinate pairs is omitted and the step of computing the differences between the current and previous values is always executed.

18. The method of claim 16 wherein said encoding flags each occupy two bits, and said value indicative of a pen touchdown is binary 01, said value indicative of skipped values is binary 10, and said value indicative of the end of a sequence or of the end of all sequences is binary 11.

19. The method of claim 16 wherein said encoded form of said differences comprises two bits representing the difference between said current and previous horizontal coordinates and two bits representing the difference between said current and previous vertical coordinates, each said difference being coded as binary 00 if its value is zero, binary 01 if its value is 1, and binary 10 if its value is −1, the binary value 11 not being used.

20. The method of claim 16 wherein the said absolute values of horizontal and vertical coordinate pairs are stored with eight bits of resolution, one byte for each of the horizontal and vertical coordinates.

21. The method of claim 16 wherein the said absolute values of horizontal and vertical coordinate pairs are stored with twelve bits of resolution, in the order of the low byte of the horizontal coordinate, followed by the low byte of the vertical coordinate, followed by the high nybble of the horizontal coordinate concatenated with the high nybble of the vertical coordinate.

\* \* \* \* \*